United States Patent [19]

Lopez

[11] Patent Number: 4,656,772

[45] Date of Patent: Apr. 14, 1987

[54] FISHING DEVICE

[76] Inventor: Manuel Lopez, 900 NW. 1 St., Belle Glades, Fla. 33430

[21] Appl. No.: 917,700

[22] Filed: Oct. 10, 1986

[51] Int. Cl.$^4$ .............................................. A01K 97/00
[52] U.S. Cl. ................................................ 43/4; 43/25
[58] Field of Search ....................................... 43/4, 25

[56] References Cited

U.S. PATENT DOCUMENTS

| | | | |
|---|---|---|---|
| 664,889 | 1/1901 | Ogimura | 43/25 |
| 1,709,436 | 4/1929 | Koester | 43/25 |
| 2,640,290 | 6/1953 | Ames et al. | 43/25 |
| 2,714,272 | 8/1955 | Tuttle | 43/25 |
| 2,791,858 | 5/1957 | Kernodle | 43/25 |
| 2,804,711 | 9/1957 | Kozar | 43/25 |

Primary Examiner—M. Jordan
Attorney, Agent, or Firm—Jesus Sanchelima

[57] ABSTRACT

A fishing device for manually controlling a fishing line that utilizes the pulling force of a hooked fish to proportionally oppose that very same force without requiring an appreciable effort on the part of the user. A finger grip assembly is hingedly mounted to a line guiding assembly and the fishing line is passed between them. The fishing line is guided from one end to the other of the guiding assembly and passed through a passageway that diverts the pulling force to help sandwich the fishing line thereby frictionally opposing the pulling force of the hooked fish. Brake plates are mounted on the inner opposing walls to provide the frictionally opposing force indirectly.

8 Claims, 5 Drawing Figures

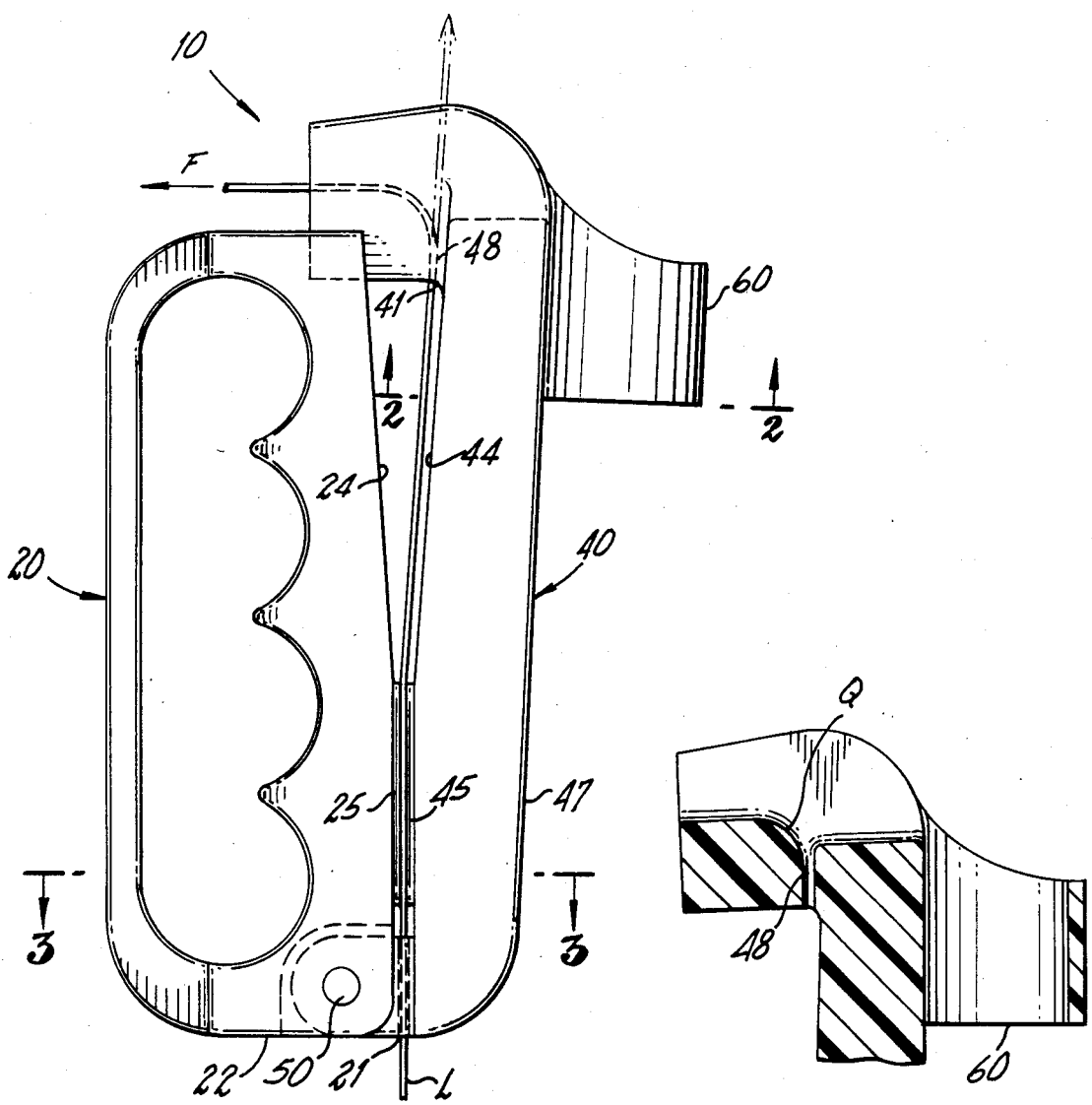
FIG. 1.
FIG. 2.
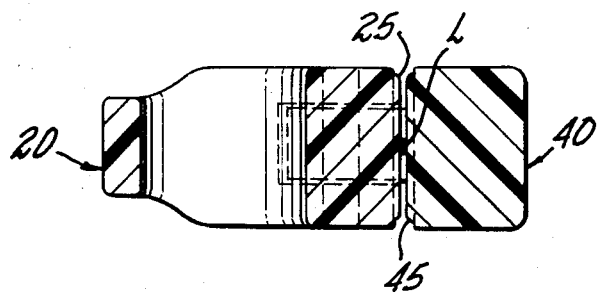
FIG. 3.

FISHING DEVICE

BACKGROUND OF THE INVENTION

1. Field of the Invention

The present invention relates to a fishing device, and more particularly, to such a device that uses the pulling force exerted by a hooked fish to frictionally retain the line.

2. Description of the Related Art

There are a number of brake mechanisms associated with fishing reels, however, nothing appears close to the present invention which is used in conjuction with a manual reel and it does not include a fishing rod. An example of one of these controls for fishing reels are disclosed in U.S. Pat. No. 2,714,272 issued to R. C. Tuttle. The brake release system used here is not activated or helped by the pulling force of the fish.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a fishing device that can be used with any fishing line and convert the pulling force of the fish into a frictional force on the line that opposes the fish pulling force.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an elevational side view of the invention showing two possible passages for the fishing line.

FIG. 2 shows a cross-sectional view taken along line 2—2 in FIG. 1.

FIG. 3 illustrates a cross-sectional view taken along line 3—3 in FIG. 1.

DETAILED DESCRIPTION OF THE PREFERRED EMBODIMENT

Figure 4:
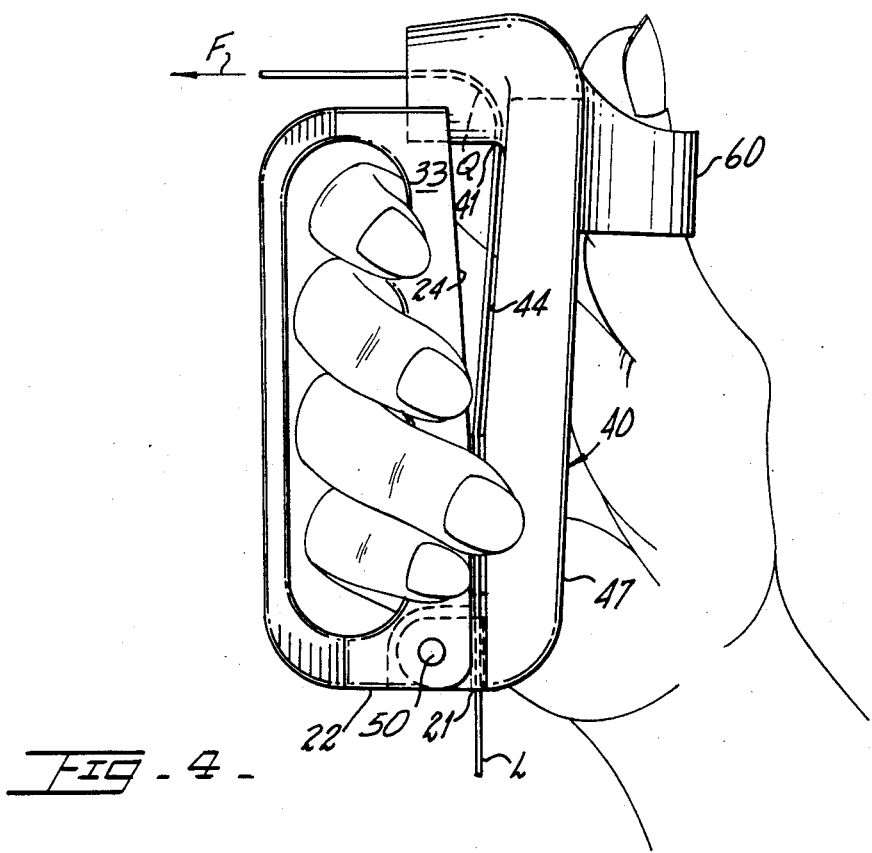
FIG. 4 is a representation of the use of the invention when the user is pulling in the line.

Referring now to FIG. 1, it can be observed that the fishing device, generally referred to with numeral 10, basically consists of a grip assembly 20 that is pivotally mounted on one end 22 to line guiding assembly 40 through pin 50. Line guiding assembly 40 is preferably slightly longer than grip assembly 20. Fishing device 10 is to be used with, preferably, a manual reel (not shown) containing line L or any other device that would prevent entanglement of line L. A pair of opposing brake segments or plates, 25 and 45, are mounted on the inner opposing walls, 24 and 44, of grip assembly 20 and line guiding assembly 40, respectively. Brake segments 25 and 45 may be integrally made with a hardened plastic or with a metal plate, such as an anticorrosive metal like stainless steel. Line L goes through opening 21 on lower end 22 of grip assembly 20 and passes between plates 25 and 45 and up through opening 41 on the upper end of line guiding assembly 40. From there, line L may be inserted either through passageway 48.

Figure 5:
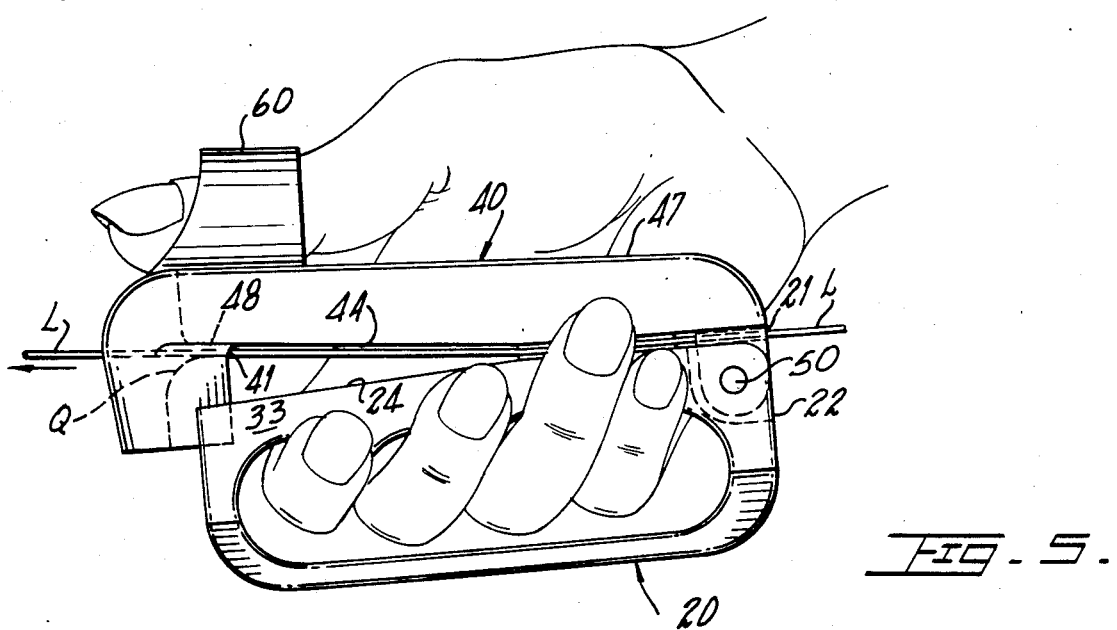
FIG. 5 shows the use of the invention when casting a fishing line.

If a user wants to cast line L far away, line L is brought right out through longitudinally extending passageway 48 and device 10 held in the position shown in FIG. 5. When a fish is hooked and tries to escape, pulling force F will cause line L to bring line guiding assembly 40 towards grip assembly 20 by applying at least part of pulling force F on diverting point Q. Device 10 should be upright, at this time, as shown in FIG. 4 for the maximum torque to develop. This causes plates 25 and 45 to frictionally oppose force F proportionally. Therefore, the larger the pulling force F is, the more friction is applied to line L by friction plates 25 and 45 without requiring any gripping force from the user.

As it can be seen from FIG. 4, a user inserts his thumb through thumb strap 60 and, together with finger grip portion 33, help the user maintain device 10 in upright position. When the user wants to freely release line L, he maintains device 10 horizontally as shown in FIG. 5.

Plates 25 and 45 are preferably made out metal but any other hardened plastic material may be utilized as long as it withstands the frictional erosion of line L. If metal is to be used, the edges must be chamfered so that line L is not damaged. The body of device 10 is preferably made out of a moldable plastic material of low weight and suitable for mass production. The back 47 of line guiding assembly 40 is anatomically designed to provide a comfortable grip with the user's palm and the same is true for finger grip portion 33. Preferably, device 10 is to be designed so that it can be utilized by left and right handed users, indistinctively.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A fishing device for manually controlling a fishing line, comprising:

A. finger grip means having an upper and a lower portion;

B. line guiding means having an upper and lower end and said upper end protruding slightly over said upper portion, said line guiding means being hingedly mounted on said lower end to said lower portion of said finger grip means and said line guiding means including an opening on its lower end that allows said fishing line through and between said line guiding means and said finger grip means, and further including a passageway on the upper end of said line guiding means so that said fishing line is passed through it and so arranged and constructed that when said device is held in the upright position any pulling force on said fishing line is diverted and proportionally converted into a torque on said line guiding means with respect to said finger grip means that causes a frictional opposition to said pulling force.

2. The device set forth in claim 1 wherein said finger grip means and line guiding means include each one opposing wall and each of said opposing walls includes a brake plate mounted thereon so that said frictional opposing force is applied to said fishing line through said brake plates.

3. The device set forth in claim 2 wherein said line guiding means is slightly longer than said finger grip means.

4. The device set forth in claim 3 wherein said first passageway extends longitudinally outwardly.

5. The device set forth in claim 4 further including a second passageway that extends perpendicular to said first passageway and towards said finger grip means.

6. The device set forth in claim 5 wherein said device is made out of plastic.

7. The device set forth in claim 6 wherein said brake plates are made out of metal.

8. The device set forth in claim 7 wherein said brake plates are integrally made out of a hardened plastic material.

* * * * *